United States Patent
Minoo et al.

(10) Patent No.: US 10,218,970 B2
(45) Date of Patent: Feb. 26, 2019

(54) RESAMPLING FILTERS FOR SCALABLE VIDEO CODING WITH PHASE OFFSET ADJUSTMENT AND SIGNALING OF SAME

(71) Applicant: General Instrument Corporation, Horsham, PA (US)

(72) Inventors: Koohyar Minoo, San Diego, CA (US); David M. Baylon, San Diego, CA (US); Ajay Luthra, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 655 days.

(21) Appl. No.: 14/332,133

(22) Filed: Jul. 15, 2014

(65) Prior Publication Data

US 2015/0023435 A1     Jan. 22, 2015

Related U.S. Application Data

(60) Provisional application No. 61/847,072, filed on Jul. 16, 2013.

(51) Int. Cl.

| | |
|---|---|
| *H04N 19/33* | (2014.01) |
| *H04N 19/80* | (2014.01) |
| *H04N 19/117* | (2014.01) |
| *H04N 19/186* | (2014.01) |
| *H04N 19/17* | (2014.01) |
| *H04N 19/59* | (2014.01) |

(Continued)

(52) U.S. Cl.
CPC ........... *H04N 19/117* (2014.11); *H04N 19/17* (2014.11); *H04N 19/186* (2014.11); *H04N 19/33* (2014.11); *H04N 19/59* (2014.11); *H04N 19/46* (2014.11); *H04N 19/70* (2014.11)

(58) Field of Classification Search
CPC ............. H04N 19/00436; H04N 19/59; H04N 19/0089; H04N 19/33; H04N 19/80
USPC ..................................................... 375/240.29
See application file for complete search history.

(56) References Cited

U.S. PATENT DOCUMENTS

| | | | |
|---|---|---|---|
| 2006/0222067 A1* | 10/2006 | Park | H04N 19/105 375/240.08 |
| 2007/0189382 A1* | 8/2007 | Park | H04N 19/105 375/240.08 |

(Continued)

OTHER PUBLICATIONS

PCT Search Report & Written Opinion, Re: Application #PCT/US2014/046763; dated Oct. 8, 2014.

(Continued)

*Primary Examiner* — Zaihan Jiang
(74) *Attorney, Agent, or Firm* — Thomas A. Ward

(57) ABSTRACT

Upsampling filters for use in scalable video coding may be selected from a set of filters each with a different phase. In order to accommodate a phase offset introduced from downsampling required to maintain proper luma/chroma color space positions after upsampling, an offset parameter may be used in computing the filter index. Moreover, a different offset may be used for each filter index. These offsets in effect provide a re-mapping of the filter indices. By remapping the filter indices in this manner the performance of the upsampling process can be improved and errors introduced by rounding or which are caused by the finite precision of the process used to compute the filter indices can be taken into account.

20 Claims, 5 Drawing Sheets

(51) Int. Cl.
*H04N 19/70* (2014.01)
*H04N 19/46* (2014.01)

(56) References Cited

U.S. PATENT DOCUMENTS

| | | | | |
|---|---|---|---|---|
| 2007/0189385 A1* | 8/2007 | Park | ............ | H04N 19/46 |
| | | | | 375/240.12 |
| 2009/0010331 A1* | 1/2009 | Jeon | ............ | H04N 19/105 |
| | | | | 375/240.12 |
| 2009/0060034 A1* | 3/2009 | Park | ............ | H04N 19/105 |
| | | | | 375/240.12 |
| 2009/0310680 A1* | 12/2009 | Jeon | ............ | H04N 19/105 |
| | | | | 375/240.16 |
| 2010/0283895 A1 | 11/2010 | Sun | | |
| 2013/0329782 A1* | 12/2013 | Seregin | ............ | H04N 19/159 |
| | | | | 375/240.02 |
| 2014/0307774 A1* | 10/2014 | Minoo | ............ | H04N 19/70 |
| | | | | 375/240.02 |
| 2014/0355676 A1* | 12/2014 | Seregin | ............ | H04N 19/513 |
| | | | | 375/240.12 |
| 2015/0023435 A1* | 1/2015 | Minoo | ............ | H04N 19/00436 |
| | | | | 375/240.29 |
| 2015/0341661 A1* | 11/2015 | Alshina | ............ | H04N 19/30 |
| | | | | 375/240.12 |
| 2015/0382009 A1* | 12/2015 | Chen | ............ | H04N 19/82 |
| | | | | 375/240.16 |

OTHER PUBLICATIONS

K. Minoo, et al., "AHG13: SHVC Upsampling with phase offset adjustment", 13th JCT-VC Meeting, 104th MPEG Meeting (Joint Collaborative Team on Video Coding of ISO/IEC JTC1/SC29/WG11 and ITU-T SG.16), Apr. 11, 2013, 8 pgs.

J. Dong, et al., "Upsampling based on sampling grid information for aligned inter layer protection", 13th JCT-VC Meeting, 104th MPEG Meeting (Joint Collaborative Team on Video Coding of ISO/IEC JTC1/SC29/WG11 and ITU-T SG.16), Apr. 8, 2013, 10 pgs.

J. Chen, et al., "SHVC Test Model 1 (SHM 1)" 12th JCT-VC Meeting, 103rd MPEG Meeting (Joint Collaborative Team on Video Coding of ISO/IEC JTC1/SC29/WG11 and ITU-T SG.16), Feb. 15, 2013, 42 pgs.

Official Action, Re: Canadian Application No. 2,918,456, dated Feb. 13, 2017.

Examination Report, Re: European Application No. 14750060.7, dated Mar. 28, 2017.

* cited by examiner

| pic_parameter_set_rbsp( ) { | Descriptor |
|---|---|
|   pps_pic_parameter_set_id | ue(v) |
|   pps_seq_parameter_set_id | ue(v) |
|   for( i = 0; i < 2; i++ ) { | |
|     luma_offset_flag[i] | u(1) |
|     if ( luma_offset_flag[i] ) { | |
|       for( j = 0; j < 16; j++ ) | |
|         luma_filter_offset[ i ][ j ] | se(v) |
|     } | |
|     chroma_offset_flag[i] | u(1) |
|     if ( chroma_offset_flag[i] ) { | |
|       for( j = 0; j < 16; j++ ) | |
|         chroma_filter_offset[ i ][ j ] | se(v) |
|     } | |
|   } | |
|   ... | |
| } | |

Syntax for signaling of filter offsets

FIGURE 5

RESAMPLING FILTERS FOR SCALABLE VIDEO CODING WITH PHASE OFFSET ADJUSTMENT AND SIGNALING OF SAME

CROSS REFERENCE TO RELATED APPLICATION

This application claims priority under 35 U.S.C. § 119(e) from earlier filed U.S. Provisional Application Ser. No. 61/847,072, filed Jul. 16, 2013 and incorporated herein by reference in its entirety.

TECHNICAL FIELD

The present invention relates to a sampling filter process for scalable video coding. More specifically, the present invention relates to re-sampling using video data obtained from an encoder or decoder process, where the encoder or decoder process can be MPEG-4 Advanced Video Coding (AVC) or High Efficiency Video Coding (HEVC).

BACKGROUND

Scalable video coding (SVC) refers to video coding in which a base layer, sometimes referred to as a reference layer, and one or more scalable enhancement layers are used. For SVC, the base layer can carry video data with a base level of quality. The one or more enhancement layers can carry additional video data to support higher spatial, temporal, and/or signal-to-noise SNR levels. Enhancement layers may be defined relative to a previously coded layer.

The base layer and enhancement layers can have different resolutions. Upsampling filtering, sometimes referred to as resampling filtering, may be applied to the base layer in order to match a spatial aspect ratio or resolution of an enhancement layer. This process may be called spatial scalability. An upsampling filter set can be applied to the base layer, and one filter can be chosen from the set based on a phase (sometimes referred to as a fractional pixel shift). The phase may be calculated based on the ratio between base layer and enhancement layer picture resolutions.

SUMMARY

Embodiments of the present invention provide methods, devices and systems for deriving upsampling filters for use in scalable video coding. The upsampling filters that are used may be selected from a set of filters each with a different phase. In order to accommodate a phase offset introduced from downsampling required to maintain proper luma/chroma color space positions after upsampling, an offset parameter may be used in computing the filter index. Moreover, a different offset may be used for each filter index. These offsets in effect provide a re-mapping of the filter indices. By remapping the filter indices in this manner the performance of the upsampling process can be improved and errors introduced by rounding or which are caused by the finite precision of the process used to compute the filter indices can be taken into account.

BRIEF DESCRIPTION OF THE DRAWINGS

Further details of the present invention are explained with the help of the attached drawings in which:

FIG. 5 shows a table that includes an example of the syntax that may be used for signaling the phase shift offsets using the syntax elements defined herein;

DETAILED DESCRIPTION

Overview of Upsampling Process

Figure 1:
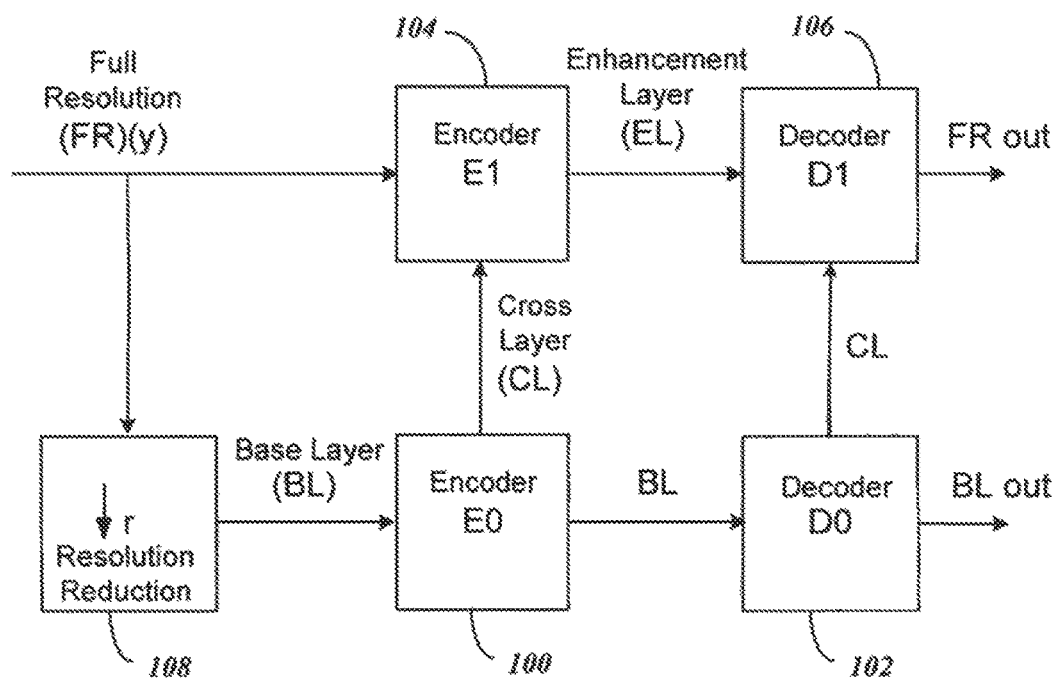
FIG. 1 is a block diagram of components in a scalable video coding system with two layers.

An example of a scalable video coding system using two layers is shown in FIG. 1. In the system of FIG. 1, one of the two layers is the Base Layer (BL) where a BL video is encoded in an Encoder E0, labeled 100, and decoded in a decoder D0, labeled 102, to produce a base layer video output BL out. The BL video is typically at a lower quality than the remaining layers, such as the Full Resolution (FR) layer that receives an input FR (y). The FR layer includes an encoder E1, labeled 104, and a decoder D1, labeled 106. In encoding in encoder E1 104 of the full resolution video, cross-layer (CL) information from the BL encoder 100 is used to produce enhancement layer (EL) information. The corresponding EL bitstream of the full resolution layer is then decoded in decoder D1 106 using the CL information from decoder D0 102 of the BL to output full resolution video, FR out. By using CL information in a scalable video coding system, the encoded information can be transmitted more efficiently in the EL than if the FR was encoded independently without the CL information. An example of coding that can use two layers shown in FIG. 1 includes video coding using AVC and the Scalable Video Coding (SVC) extension of AVC, respectively. Another example that can use two layer coding is HEVC.

FIG. 1 further shows block 108 with a down-arrow r illustrating a resolution reduction from the FR to the BL to illustrate that the BL can be created by a downsampling of the FR layer data. Although a downsampling is shown by the arrow r of block 108 FIG. 1, the BL can be independently created without the downsampling process. Overall, the down arrow of block 108 illustrates that in spatial scalability, the base layer BL is typically at a lower spatial resolution than the full resolution FR layer. For example, when r=2 and the FR resolution is 3840×2160, the corresponding BL resolution is 1920×1080.

The cross-layer CL information provided from the BL to the FR layer shown in FIG. 1 illustrates that the CL information can be used in the coding of the FR video in the EL. In one example, the CL information includes pixel information derived from the encoding and decoding process of the BL. Examples of BL encoding and decoding are AVC and HEVC. Because the BL pictures are at a different spatial resolution than the FR pictures, a BL picture needs to be upsampled (or re-sampled) back to the FR picture resolution in order to generate a suitable prediction for the FR picture.

Figure 2:
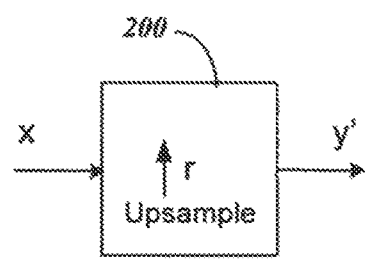
FIG. 2 illustrates an upsampling process that can be used to convert the base layer data to the full resolution layer data for FIG. 1.

FIG. 2 illustrates an upsampling process in block 200 of data from the BL layer to the EL. The components of the upsampling block 200 can be included in either or both of the encoder E1 104 and the decoder D1 106 of the EL of the video coding system of FIG. 1. The BL data at resolution x that is input into upsampling block 200 in FIG. 2 is derived from one or more of the encoding and decoding processes of the BL. A BL picture is upsampled using the up-arrow r process of block 200 to generate the EL resolution output y' that can be used as a basis for prediction of the original FR input y.

The upsampling block 200 works by interpolating from the BL data to recreate what is modified from the FR data. For instance, if every other pixel is dropped from the FR in block 108 to create the lower resolution BL data, the dropped pixels can be recreated using the upsampling block 200 by interpolation or other techniques to generate the EL resolution output y' from upsampling block 200. The data y' is then used to make encoding and decoding of the EL data more efficient. For example, the difference between y' and y can be used for coding.

Figure 3:
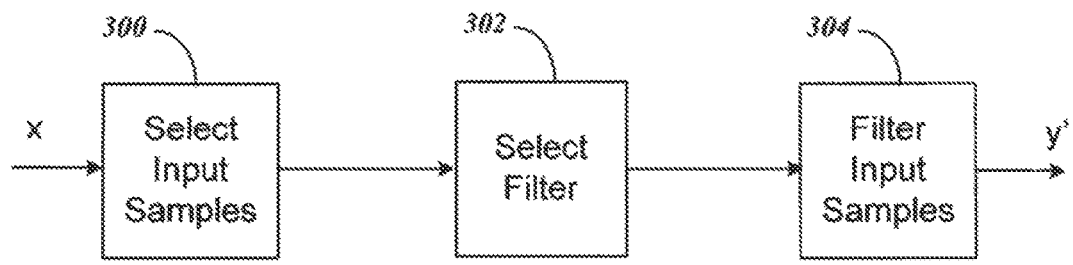
FIG. 3 shows a block diagram of components for implementing the upsampling process of FIG. 2.

FIG. 3 shows a general block diagram for implementing an upsampling process of FIG. 2 for embodiments of the present invention. The upsampling or re-sampling process can be determined to minimize an error E (e.g. mean-squared error) between the upsampled data y' and the full resolution data y. The system of FIG. 3 includes a select input samples module 300 that samples an input video signal. The system further includes a select filter module 302 to select a filter from the subsequent filter input samples module 304 to upsample the selected input samples from module 300.

In module 300, a set of input samples in a video signal x is first selected. In general, the samples can be a two-dimensional subset of samples in x, and a two-dimensional filter can be applied to the samples. The module 302 receives the data samples in x from module 300 and identifies the position of each sample from the data it receives, enabling module 302 to select an appropriate filter to direct the samples toward a subsequent filter module 304. The filter in module 304 is selected to filter the input samples, where the selected filter is chosen or configured to have a phase corresponding to the particular output sample location desired.

The filter input samples module 304 can include separate row and column filters. The selection of filters is represented herein by the P as filters h[n; p], where p is a phase index that runs from 0 to (P−1). That is, if, for instance, P=10, then there are a family of 10 filters h[n; 0], h[n; 1] . . . h[n; 9]. Each filter can have N+1 coefficients e.g., a filter with phase index p=3 has the coefficients h[0; 3], h[1; 3] . . . h[N; 3]. As used herein a family of P filters will be denoted as h[n,p], whereas a particular filter having a selected phase will be denoted as h[n], where the filter has N+1 coefficients. The output of the filtering process using the selected filter h[n] on the selected input samples produces output value y'.

Figure 4:
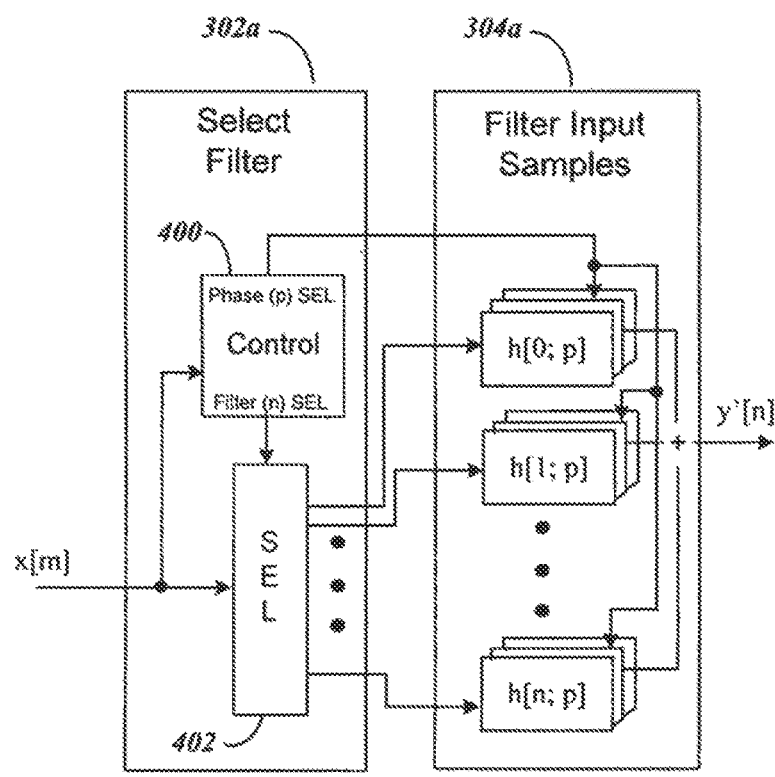
FIG. 4 shows components of the select filter module and the filters, where the filters are selected from fixed or adaptive filters to apply a desired phase shift.

FIG. 4 shows details of components for the select sample module 302 of FIG. 3 (labeled 302a in FIG. 4) and the filters module 304 of FIG. 3 (labeled 304a in FIG. 4) for a system with fixed filters. For separable filtering the input samples can be along a row or column of data. To supply a set of input samples from select input samples module 300, the select filter module 302a includes a select control 400 that identifies the input samples x[m] and provides a signal to a selector 402 that directs them through the selector 402 to a desired filter. The filter module 304a then includes the different filters h[n;p] that can be applied to the input samples, where the filter phase can be chosen among P phases from each row or column element depending on the output sample n desired. As shown, the selector 402 of module 302a directs the input samples to a desired column or row filter in 304a based on the "Filter (n) SEL" signal from select control 400. A separate select control 400 signal "Phase (p) SEL" selects the appropriate filter phase p for each of the row or column elements. The filter module 304a output produces the output y'[n].

In FIG. 4, the outputs from individual filter components of h[n;p] are shown being added "+" to produce the output y'[n]. This illustrates that each box, e.g. h[0;p], represents one coefficient or number in a filter with phase index p. Therefore, the filter represented by a phase index p includes all N+1 coefficients in h[0,p], . . . , h[N;p]. This is the filter that is applied to the selected input samples to produce an output value y'[n], for example, y'[0]=h[0,p]*x[0]+h[1,p]*x[1]+ . . . +h[N,p]*x[N], requiring the addition function "+" as illustrated. As an alternative to adding in FIG. 4, the "+" could be replaced with a solid connection and the output y'[n] would be selected from one output of a bank of P filters representing the P phases, with the boxes h[n:p] in module 304a relabeled, for example, as h[n;0], h[n,1], . . . , h[n,P−1] and now each box would have all the filter coefficients needed to form y' [n] without the addition element required.

Although the filters h[n:p] in module 304a are shown as having fixed phases, they can be implemented using a single filter with the phase being selected and adaptively controlled. The adaptive phase filters can be reconfigured, for example, by software. The adaptive filters can thus be designed so that each filter h[n] corresponds to a desired phase. The filter coefficients h[n] for a given filter can be signaled in the EL from the encoder so that the decoder can reconstruct a prediction to the FR data.

Phase selection for the filters h[n:p] enables recreation of the FR layer from the BL data. For example, if the BL data is created by removing every other pixel of data from the FR, to recreate the FR data from the BL data, the removed data must be reproduced or interpolated from the BL data available. In this case, depending on whether even or odd indexed samples are removed, the appropriate filter h[n;p] with a phase represented by a phase index p can be used to interpolate the new data. The selection of P different phase filters from the filters h[n:p] allows the appropriate phase shift to be chosen to recreate the missing data depending on how the BL data is downsampled from the FR data.

Separable Column and Row Filtering

As previously mentioned, the resampling filters can be one-dimensional or two-dimensional filters. Generally, a one-dimensional filter is separately applied to the rows and columns of the video signal and, although the same filter is generally used for the columns and for the rows. For the re-sampling process, in one embodiment the filters applied can be separable, and the coefficients for each horizontal (row) and vertical (column) dimension can be signaled or selected from a set of filters. The processing of row or columns separably allows for flexibility in filter characteristics (e.g. phase offset, frequency response, number of taps, etc.) in both dimensions while retaining the computational benefits of separable filtering. In addition, however, it may be advantageous to employ different filters for the rows and columns since the characteristics of the data may differ along the rows relative to the columns.

Upsampling with Phase Offset Adjustment

In order to interpolate pixel values in the EL, it is necessary to find a pixel in the BL that corresponds to a pixel in the EL. To accomplish this, the upsampling process requires knowledge of the alignment between pixels in the BL and the EL. Since the pixels in the two layers may not be exactly aligned, the offset between them is expressed in terms of a fractional pixel shift, which is referred to as a phase offset. The phase offset cannot be expressed with infinite precision. Rather, in Scalable HEVC (SHEVC) Test Model 1.0 (SHM1.0) a phase resolution of 1/16 is employed, That is, the offset between pixels in the BL and EL can be interpolated to within a 1/16 of a pixel. In the upsampling process each phase offset corresponds to a different upsampling filter and thus in SHM1.0 16 filters are used to represent the 16 phase offsets. While a phase resolution of 1/16 will be used by way of example, in the following discussion, those of ordinary skill in the art will recognized that the techniques described herein are equally applicable to other phase resolutions as well.

In SHM1.0 a set of 16 fixed filters with different phase offsets in the unit interval can be specified. These filters are indexed where larger filter indices are used for larger phase offsets. In order to accommodate a phase offset introduced from downsampling required to maintain proper luma/chroma color space positions after upsampling, co-pending U.S. Appl. Ser. No. 14/250,349 proposes that an offset parameter be signaled and used in computing the filter index separate from the normative offset. As discussed therein, different phase offsets may be signaled for the luma and chroma color spaces and for each of the horizontal and vertical dimensions. However, the same phase offset is used for each filter index used in upsampling for a given luma/chroma color space and a given dimension. In other words, this approach assumes that for a given luma/chroma color space and a given dimension each pair of corresponding pixels in the BL and the EL are offset by the same amount.

For a variety of reasons the pairs of corresponding pixels in the BL and the EL may not be offset by the same amount, even for a given luma/chroma color space and a given dimension. Accordingly, the use of a single phase offset for each filter index may not always be satisfactory. In such cases it may be preferable to apply a different offset to each filter index. These offsets in effect provide a re-mapping of the filter indices. The increased flexibility of this approach can improve performance and compensate for errors introduced by rounding or the finite precision in the computation of the filter indices based on the scalability ratio and/or downsampling phase offsets.

Signaling of Phase Offset Shift

The phase offsets that are selected for each filter index can be signaled using any suitable syntax. In some embodiments the signals may occur at the picture parameter set (PPS) level or PPS extension. Note that signaling may occur at other places within the PPS. Alternatively, signaling can be specified at other levels, e.g., the sequence parameter set (SPS), video parameter set (VPS), slice, prediction unit (PU), etc. Further, although offset adjustment is being accounted for in luma/chroma phase positions, similar phase compensation can be made for color spaces, cropping, etc.

An illustrative example of the syntax elements that may be employed in the context of SHM1.0 whenever CL prediction is enabled is as follows.

luma_offset_flag[0] equal to 1 indicates that the filter index offsets for upsampling the rows of the luma component are signaled. luma_offset_flag[0] equal to 0 indicates that the filter index offsets for upsampling the rows of the luma component are not signaled.

luma_offset_flag[1] equal to 1 indicates that the filter index offsets for upsampling the columns of the luma component are signaled. luma_offset_flag[1] equal to 0 indicates that the filter index offsets for upsampling the columns of the luma component are not signaled.

chroma_offset_flag[0] equal to 1 indicates that the filter index offsets for upsampling the rows of the chroma component are signaled. chroma_offset_flag[0] equal to 0 indicates that the filter index offsets for upsampling the rows of the chroma component are not signaled.

chroma_offset_flag[1] equal to 1 indicates that the filter index offsets for upsampling the columns of the chroma component are signaled. chroma_offset_flag[1] equal to 0 indicates that the filter index offsets for upsampling the columns of the chroma component are not signaled.

luma_filter_offset[i][j] specifies the offset value used to modify the luma filter index j in the upsampling process along direction i. This is a signed value between −15 to +15 (given a scaled grid size of 16×).

chroma_filter_offset[i][j] specifies the offset value used to modify the chroma filter index j in the upsampling process along direction i. This is a signed value between −15 to +15 (given a scaled grid size of 16×).

FIG. 5 shows a table that includes an example of the syntax that may be used for signaling the phase shift offsets using the syntax elements defined above. In this example the column denoted Descriptor specifies the format that is to be used in signaling the values of the various syntax elements. In the example of the table shown in FIG. 5, the syntx specifies a re-mapping of filter indices for a given picture. It is also possible to signal more than one re-mapping for different picture types (or slices, PU, etc.) using similar additional syntax elements. One example where this might be appropriate is for the case of field pictures.

Luma and Chroma Sample Interpolation Process

The above syntax is proposed for the Joint Collaborative Team on Video Coding (JCT-VC), SHVC Test Model (SHM 1) Section G.6.2 entitled "Derivation process for reference layer sample location used in resampling," and in particular see J. Chen, J. Boyce, Y. Ye, M. Hannuksela, "Draft of SHVC Test Model Description," JCTVC-L1007, January 2013. The proposed text for this particular version of the document SHVC G.6.2 includes information helpful in understanding the syntax, so in some implementations it may be modified as follows:

For the SHVC text in G.6.2, the inputs to this process are:
a variable cIdx specifying the color component index, and
a sample location (xP, yP) relative to the top-left sample of the color component of the current picture (i.e., the pixel position in the EL) specified by cIdx.

The output of this process for a 16× reference layer picture (i.e., the BL) is a sample location (xRef16, yRef16) specifying the reference layer sample location in units of 1/16-th sample relative to the top-left sample of the reference layer picture.

The variables xRef and xPhase for the luma component are derived as follows:

```
xRef = ( xRef16 >> 4 )
if ( luma_offset_flag[0] )
{
  temp_xPhase = ( xRef16 ) % 16
  xPhase = ( temp_xPhase + luma_filter_offset[ 0 ][ temp_xPhase ] )
  % 16
  xRef = xRef + ( temp_xPhase + luma_filter_offset[ 0 ][
  temp_xPhase ] ) >> 4
}
else
  xPhase = ( xRef16 ) % 16
``` where temp_xPhase is the phase index assuming the phase offset is zero and xPhase is the phase index after applying the remapped phase offset.

Alternatively, the variables xRef and xPhase for the luma component can be derived as follows:

```
if ( luma_offset_flag[0] )
{
    temp_xPhase = ( xRef16 ) % 16
    xRef16 = xRef16 + luma_filter_offset [ 0 ][ temp_xPhase ]
}
xRef = ( xRef16 >> 4 )
xPhase = ( xRef16 ) % 16
```

Similarly, the variables yRef and yPhase for the luma component are derived as follows:

```
yRef = ( yRef16 >> 4 )
if ( luma_offset_flag[1] )
{
    temp_yPhase = ( yRef16 ) % 16
    yPhase = ( temp_yPhase + luma_filter_offset[ 1 ][ temp_yPhase ] ) % 16
    yRef = yRef + ( temp_yPhase + luma_filter_offset[ 1 ][ temp_yPhase ] ) >> 4
}
else
    yPhase = ( yRef16 ) % 16
``` where temp_yPhase is the phase index assuming the phase offset is zero and yPhase is the phase index after applying the remapped phase offset.

The alternative approach for deriving the variables xRef and xPhase for the luma component shown above may also be used to derive the variables yRef and yPhase for the luma component.

The sample location (xRef16, yRef16) for the chroma component are derived in a manner similar to the luma component. In particular, the variables xRef and xPhase for the chroma component are derived as follows:

```
xRef = ( xRef16 >> 4 )
if ( chroma_offset_flag[0] )
{
    temp_xPhase = ( xRef16 ) % 16
    xPhase = ( temp_xPhase + chroma_filter_offset[ 0 ][ temp_xPhase ] ) % 16
    xRef = xRef + ( temp_xPhase + chroma_filter_offset[ 0 ][ temp_xPhase ] ) >> 4
}
else
    xPhase = ( xRef16 ) % 16
``` where temp_xPhase is the phase index assuming the phase offset is zero and xPhase is the phase index after applying the remapped phase offset.

The variables yRef and yPhase are derived as follows:

```
yRef = ( yRef16 >> 4 )
if ( chroma_offset_flag[1] )
{
    temp_yPhase = ( yRef16 ) % 16
    yPhase = ( temp_yPhase + chroma_filter_offset[ 1 ][ temp_yPhase ] ) % 16
    yRef = yRef + ( temp_yPhase + chroma_filter_offset[ 1 ][ temp_yPhase ] ) >> 4
}
else
    yPhase = ( yRef16 ) % 16
``` where temp_yPhase is the phase index assuming the phase offset is zero and yPhase is the phase index after applying the remapped phase offset.

Note that in the coding of the offsets, e.g. luma_filter_offset[i][j], other entropy coding methods can be used instead of the example shown in the table of FIG. 5. In addition, only the offsets used for a given level (e.g. PPS or slice) need be signaled.

Figure 6:
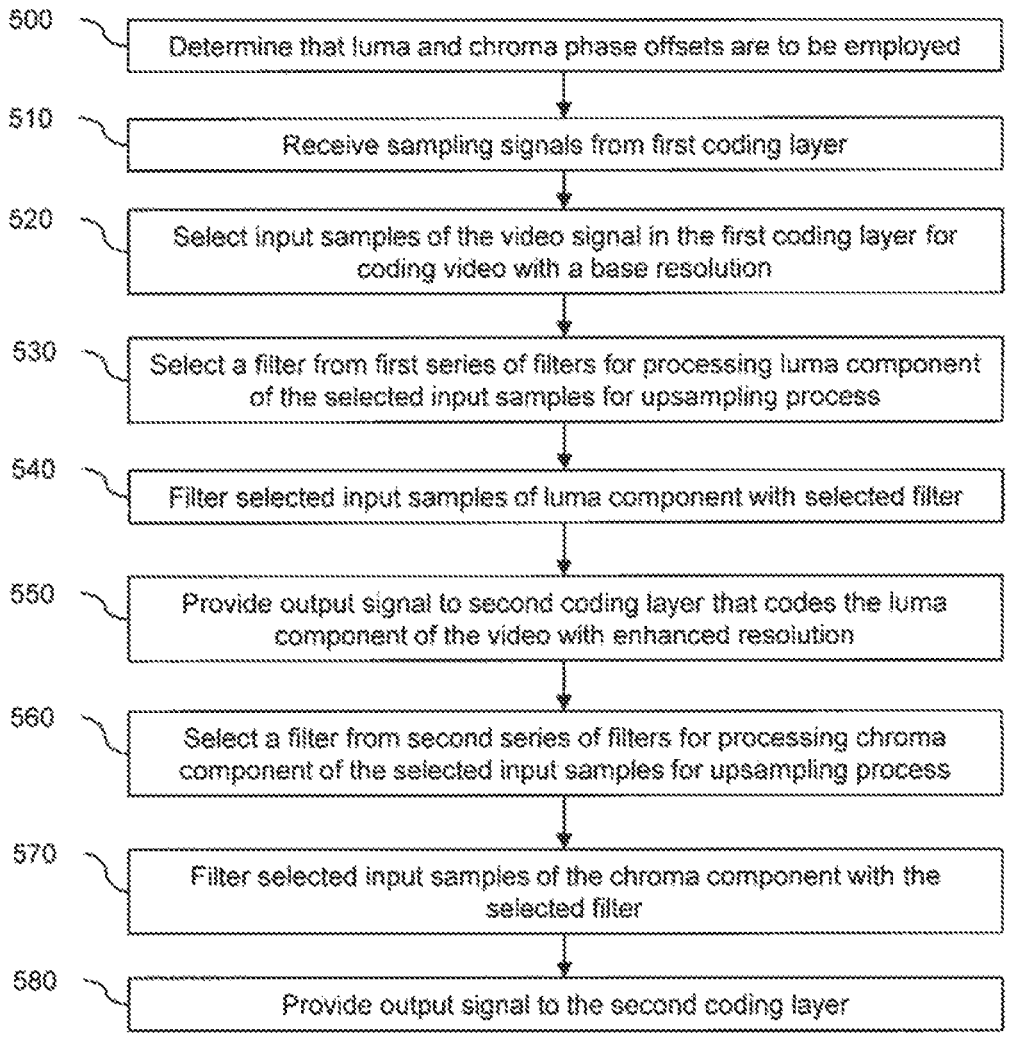
FIG. 6 is a flowchart illustrating one example of a method for coding scalable video.

FIG. 6 is a flowchart illustrating one example of a method for coding scalable video. At block 500, the cross-layer prediction is examined to determine if luma and chroma phase offsets are to be employed. If so, the method proceeds to step 510 in which sampling signals from a first coding layer are received. Input samples of the video signal in the first coding layer are selected for coding video with a base resolution at block 520. At block 530 a filter is selected from a first series of filters for processing a luma component of the selected input samples for an upsampling process. Each of the filters in the first series has a different phase index. A different phase offset is generated for each of the phase indices. The different phase offsets are used to select one of the filters in the first series. The selected input samples of the luma component are filtered with the selected filter at block 540. The resulting output signal is provided in step 550 to a second coding layer that codes the luma component of the video with an enhanced resolution having a higher resolution than a base resolution.

Next, a chroma component of the selected input samples are processed. At block 560 a filter is selected from a second series of filters for processing the chroma component of the selected input samples for the upsampling process. Each of the filters in the second series has a different phase index. A different phase offset is generated for each of the phase indices. The different phase offsets are used to select one of the filters in the second series. The selected input samples of the chroma component are filtered with the selected filter at block 570. The resulting output signal is provided in step 580 to the second coding layer that codes the chroma component of the video with an enhanced resolution having a higher resolution than a base resolution.

The encoding method described above provides a number of advantages. For instance, as previously mentioned, this technique can compensate for rounding or finite precision errors when computing filter indices. Additionally, arbitrary phase offsets per filter and color can be used in each dimension. Also, better matching of filters and phases to scalability ratios other than 2×, 1.5× can be achieved, as well as better matching of filters and phases to downsampling phase offsets.

Illustrative Operating Environment

Figure 7:
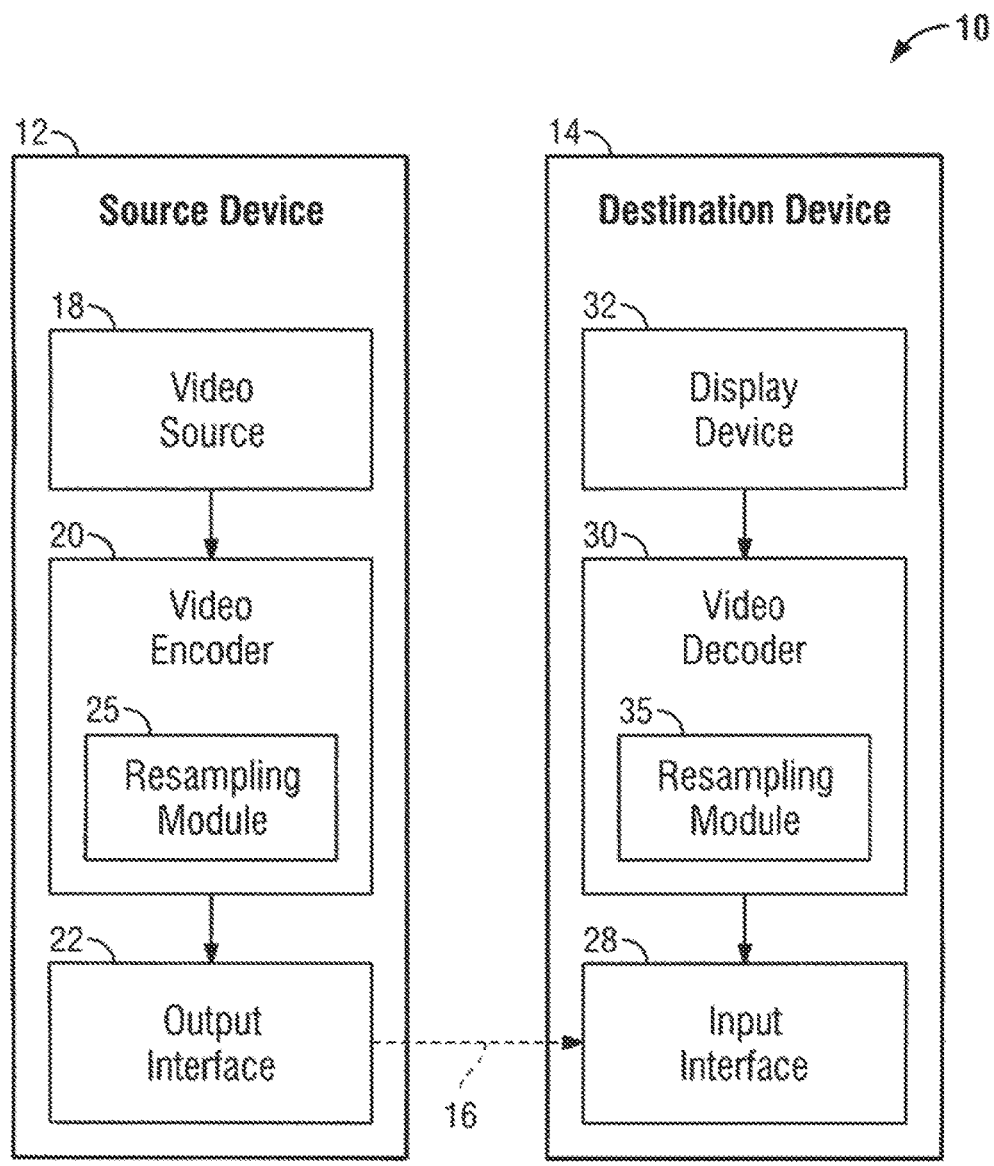
FIG. 7 is a simplified block diagram that illustrates an example video coding system.

FIG. 7 is a simplified block diagram that illustrates an example video coding system 10 that may utilize the techniques of this disclosure. As used described herein, the term "video coder" can refer to either or both video encoders and video decoders. In this disclosure, the terms "video coding" or "coding" may refer to video encoding and video decoding.

As shown in FIG. 7, video coding system 10 includes a source device 12 and a destination device 14. Source device 12 generates encoded video data. Accordingly, source device 12 may be referred to as a video encoding device. Destination device 14 may decode the encoded video data generated by source device 12. Accordingly, destination device 14 may be referred to as a video decoding device. Source device 12 and destination device 14 may be examples of video coding devices.

Destination device 14 may receive encoded video data from source device 12 via a channel 16. Channel 16 may comprise a type of medium or device capable of moving the encoded video data from source device 12 to destination device 14. In one example, channel 16 may comprise a communication medium that enables source device 12 to transmit encoded video data directly to destination device 14 in real-time.

In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14. In another example, channel 16 may correspond to a storage medium that stores the encoded video data generated by source device 12.

In the example of FIG. 7, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 7, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user.

Video encoder 20 includes a resampling module 25 which may be configured to code (e.g., encode) video data in a scalable video coding scheme that defines at least one base layer and at least one enhancement layer. Resampling module 25 may resample at least some video data as part of an encoding process, wherein resampling may be performed in an adaptive manner using resampling filters. Likewise, video decoder 30 may also include a resampling module 35 similar to the resampling module 25 employed in the video encoder 20.

Video encoder 20 and video decoder 30 may operate according to a video compression standard, such as the High Efficiency Video Coding (HEVC) standard. The HEVC standard is being developed by the Joint Collaborative Team on Video Coding (JCT-VC) of ITU-T Video Coding Experts Group (VCEG) and ISO/IEC Motion Picture Experts Group (MPEG). A recent draft of the HEVC standard, referred to as "HEVC Working Draft 7" or "WD 7," is described in document JCTVC-I1003, Bross et al., "High efficiency video coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, Apr. 27, 2012 to May 7, 2012.

Additionally or alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard or technique. Other examples of video compression standards and techniques include MPEG-2, ITU-T H.263 and proprietary or open source compression formats and related formats.

Video encoder 20 and video decoder 30 may be implemented in hardware, software, firmware or any combination thereof. For example, the video encoder 20 and decoder 30 may employ one or more processors, digital signal processors (DSPs), application specific integrated circuits (ASICs), field programmable gate arrays (FPGAs), discrete logic, or any combinations thereof. When the video encoder 20 and decoder 30 are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Also, it is noted that some embodiments have been described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Although the subject matter has been described in language specific to structural features and/or methodological acts, it is to be understood that the subject matter defined in the appended claims is not necessarily limited to the specific features or acts described above.

The invention claimed is:

1. A system for scalable video coding, comprising:
a first coding layer comprising modules for coding video with a base resolution;
a second coding layer comprising modules for coding video with an enhanced resolution having a higher resolution than a base resolution;
an upsampling unit receiving input video signals from the first coding layer and providing an output signal to the second coding layer after an upsampling process, wherein the upsampling unit output signal enables more efficient coding in the second codling layer, wherein the upsampling unit comprises:
a first module for selecting input samples from the input video signals in the first coding layer;
a second module providing selection of a plurality of filters each having a different phase index for processing the selected input samples; and
a third module including the plurality of filters, the third module for filtering the selected input samples with the selected filters, the third module providing the output signal from the upsampling unit,
wherein the first coding layer is downsampled from the second coding layer,
wherein a different phase offset is generated for each of the phase indices, wherein each of the different phase offsets is generated with a selected phase offset that is used to index a mapping table to an offset that can provide a phase shift in addition to phase rounding that is added to the selected phase offset to generate the different phase offset used to select an appropriate one of the plurality of filters used in the upsampling process to provide the output signal from the upsampling unit, and
wherein signaling of the mapping table to obtain the added phase offset occurs at a picture parameter set (PPS) level.

2. The system of claim 1, wherein at least one of a luma phase offset and chroma phase offset in downsampling is used to determine the different phase offsets to select one of the filters in the upsampling process.

3. The system of claim 2, wherein the luma phase offset and the chroma phase offsets are determined only for column filtering.

4. The system of claim 2, wherein the luma phase offset and the chroma phase offset are determined only for row filtering.

5. The system of claim 2, wherein both the luma phase offset and the chroma phase offset are determined and included in the different phase offsets to select the one of the filters in the upsampling process.

6. The system of claim 5, wherein the luma phase offset and the chroma phase offset are specified for both row and column filtering.

7. The system of claim 5, wherein each of the plurality of filters is a 1/16 phase resolution upsampling filter.

8. The system of claim 1, wherein the different phase offsets are signalled from an encoder to a decoder using a flag in the second coding layer.

9. The system of claim 1, wherein the selection of a filter from the plurality of filters is controlled by selection from the second module based on the phase offsets that are generated.

10. The system of claim 1, wherein the filters in the plurality of filters are upsampling filters and wherein the upsampling unit transmits the phase offsets of the filters from an encoder encoding the second coding layer of the video signal to a decoder decoding the second layer of the video signal.

11. The system of claim 10, wherein the phase offsets are transmitted at a unit level including at least one of a sequence parameter set (SPS), video parameter set (VPS), slice, prediction unit (PU) and picture parameter set (PPS).

12. A method for scalable video coding, comprising:
receiving sampling signals from an input video signal from a first coding layer and providing an output signal to a second coding layer that codes the input video signal with an enhanced resolution having a higher resolution than a base resolution;
selecting samples of the input video signal in the first coding layer for coding video with a base resolution;
selecting a filter from a plurality of filters for processing the selected input samples for an upsampling process, each of the filters having a different phase index;
filtering the selected input samples with the selected filter, wherein a different phase offset is generated for each of the phase indices, wherein each of the different phase offsets is generated with a selected phase offset that is used to index a mapping table to an offset that can provide a phase shift in addition to phase rounding that is added to the selected phase offset to generate the different phase offset used to select an appropriate one of the plurality of filters used to provide the output in the upsampling process, and wherein signaling of the mapping table to obtain the added phase offset occurs at a picture parameter set (PPS) level.

13. The method of claim 12, wherein at least one of a luma phase offset and chroma phase offset in downsampling is used to determine the different phase offsets to select one of the filters in the upsampling process.

14. The method of claim 13, wherein the luma phase offset and the chroma phase offsets are determined only for column filtering.

15. The method of claim 13, wherein the luma phase offset and the chroma phase offset are determined only for row filtering.

16. The method of claim 13, wherein both the luma phase offset and the chroma phase offset are determined and included in the different phase offsets to select the one of the filters in the upsampling process.

17. The method of claim 16, wherein the luma phase offset and the chroma phase offset are specified for both row and column filtering.

18. The method of claim 12, wherein each of the plurality of filters is a 1/16 phase resolution upsampling filter.

19. The method of claim 12, further comprising signalling the different phase offsets from an encoder to a decoder using a flag in the second coding layer.

20. The method of claim 19, wherein the phase offsets of the filters are transmitted at a unit level including at least one of a sequence parameter set (SPS), video parameter set (VPS), slice, prediction unit (PU) and picture parameter set (PPS).

* * * * *